United States Patent [19]

Gessler

[11] 4,393,027

[45] Jul. 12, 1983

[54] PROCESS FOR ERECTING A ROTOR ASSEMBLY FOR A ROTARY EXTRACTOR AND APPARATUS THEREFOR

[76] Inventor: Donald A. Gessler, 5702 Crestmont Ave., Verona, Pa. 15147

[21] Appl. No.: 300,190

[22] Filed: Sep. 8, 1981

[51] Int. Cl.³ .............................................. B01D 11/02
[52] U.S. Cl. ...................................... 422/269; 29/428
[58] Field of Search ............................. 422/268, 269; 260/412.4; 127/5; 29/428

[56] References Cited

U.S. PATENT DOCUMENTS 2,840,459  6/1958  Karnofsky ........................ 260/412.4
4,125,379  11/1978  Saxon ..................................... 127/5

Primary Examiner—Bernard Nozick
Attorney, Agent, or Firm—Louis E. Marn; Elliot M. Olstein

[57] ABSTRACT

There is disclosed a rotor assembly for a rotary solvent extractor comprised of segmental inner, outer and side wall assemblies provided with positioning elements for facile field erection on support beams with the segmental inner, outer and side cell walls being prefabricated and shipped in stacked relationship to the job site for field erection.

5 Claims, 4 Drawing Figures

U.S. Patent    Jul. 12, 1983    4,393,027
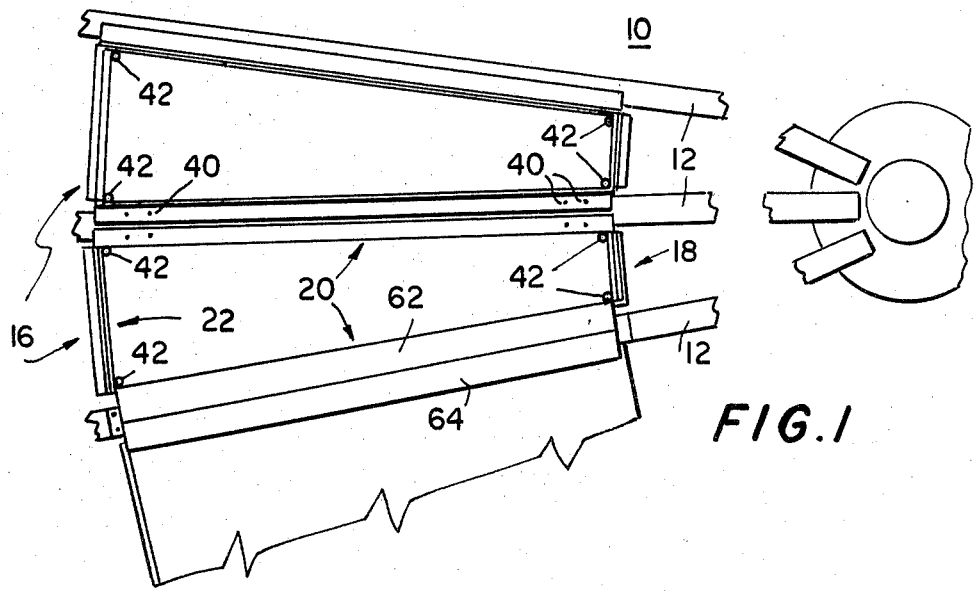
FIG.1
FIG.2
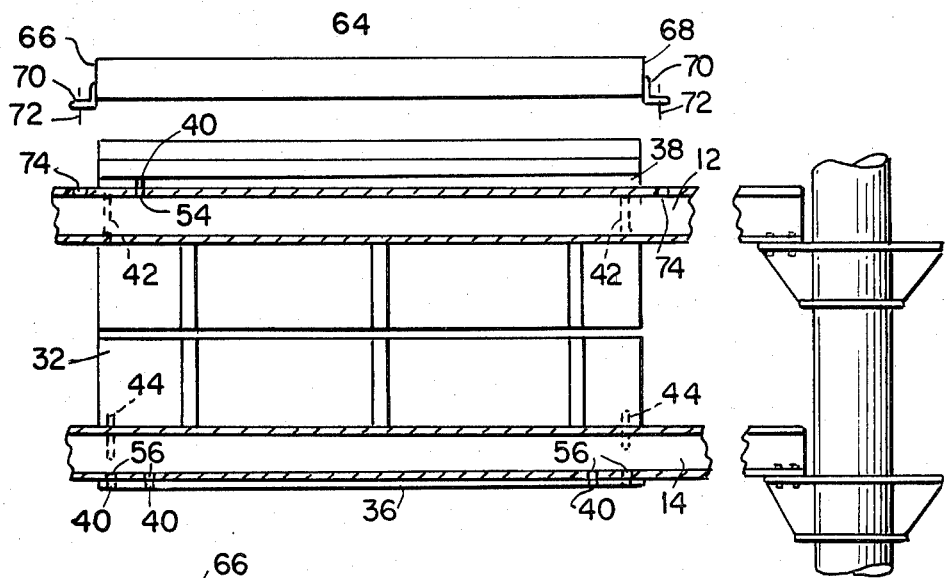
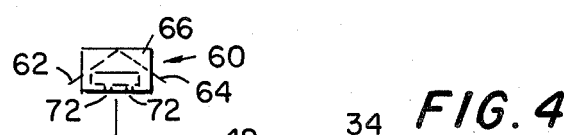
FIG.4
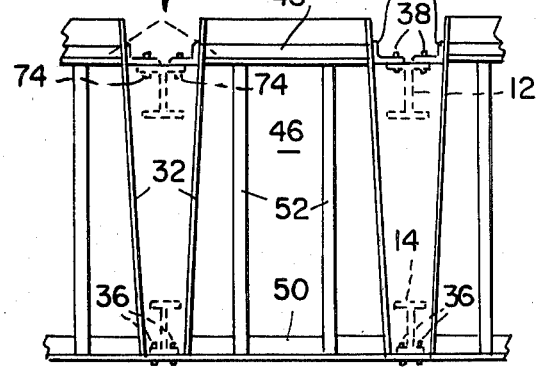
FIG.3

PROCESS FOR ERECTING A ROTOR ASSEMBLY FOR A ROTARY EXTRACTOR AND APPARATUS THEREFOR

FIELD OF THE INVENTION

This invention relates to a rotary extractor for the solvent extraction of particulate material, and more particularly to a process for the field erection of a rotor assembly for a rotary solvent extractor for the solvent extraction of soluble materials from particulate solids and the apparatus therefor.

BACKGROUND OF THE INVENTION

In U.S. Pat. No. 2,840,459, assigned to the same assignee as the present invention, there is disclosed a process and apparatus for the continuous extraction of oils and/or soluble materials from particulate material and comprised of a large vessel forming a vapor tight enclosure in which there is disposed a rotor including a plurality of cells and constituting a rotary extractor.

The rotor of the rotary extractor is comprised of a rotor shaft having upper and lower flanges to which are mounted radially-extending upper cell support I-beams and lower cell door hinge support I-beams to which are mounted vertically-disposed inner and outer walls and radially and vertically-disposed paired side walls with a gabled cap fixedly positioned on the top of the paired side walls to assist in the abrupt transfer of liquids from a preceding cell to an immediately succeeding cell and also to prevent material from falling between adjoining paired side walls.

As more clearly illustrated in U.S. Pat. no. 4,125,379, assigned to the same assignee as the present invention, each cell is comprised of radially and vertically-disposed paired side walls inclined inwardly toward the bottom portion of the respective cells to minimize tendency of solids to cling thereto. At present, the cells are fabricated complete in a fabrication shop and shipped to the job site for field erection. As a result of the massive size of each cell structure, substantial handling and shipping problems arise including high freight rates due to high void volume, special transportation requirements, damage during transportation and handling, etc.

OBJECT OF THE INVENTION

It is an object of the invention to provide an improved process for erecting a rotary assembly.

Another object of the invention is to provide an improved process for erecting the rotor assembly for a rotary extractor comprised of segmental wall members readily shipped to the job site for field erection.

A still further object of the present invention is to provide an improved process for erecting the rotor assembly for a rotary extractor resulting in substantial savings in transportation and field erection costs.

Another object of the present invention is to provide an improved rotor assembly for a rotary extractor permitting facile field erection.

SUMMARY OF THE INVENTION

These and other objects of the present invention are obtained by a rotor assembly for a rotary solvent extractor comprised of segmental inner, outer and side wall assemblies provided with positioning elements for facile field erection on support beams with the segmental inner, outer and side walls assemblies being prefabricated and shipped in stacked relationship to the job site for field erection.

BRIEF DESCRIPTION OF THE DRAWINGS

Further objects and advantages of the present invention will become apparent upon consideration of the detailed disclosure thereof, especially when taken with the accompanying drawings, wherein FIG. 1 is a partial plan view of a rotary assembly constructed in accordance with the present invention;

FIG. 2 is an elevational view of a cell thereof;

FIG. 3 is an end view of the assembly of FIG. 1 from within the rotary assembly; and FIG. 4 is an end view of the assembly of FIG. 1.

DETAILED DESCRIPTION OF THE INVENTION

Referring now to FIGS. 1 to 4, there is illustrated a portion of a rotor, generally indicated as 10, of a rotary extractor (not shown), and comprised of radially and horizontally-disposed upper cell support I-beams 12 and lower radially and horizontally-disposed cell hinge door support I-beams 14 to which are mounted cell assemblies, generally indicated as 16, comprised of inner wall member, side wall members, and outer wall member, generally indicated as 18, 20 and 22, respectively.

Each of the inner wall member 18, referring particularly to FIG. 3, is comprised of a trapezoidally-shaped plate 24 to which are mounted upper and lower lateral support elements 26 and 28, respectively, and vertically-disposed support element 30. Each side wall member 20 is comprised of a rectangularly-shaped plate 32 to which are mounted an upper laterally-extending angle element 34 and a lower laterally-extending horizontally-disposed element 36. The angle element 34 includes a horizontally-disposed leg portion 38 extending a predetermined distance outward of the outer portion of the plate 32 of the side wall member 20 when compared to the outward extension of the lateral bar member 36 to provide for the inwardly-inclined surface of each of the cells 16, as hereinabove discussed.

Each of the laterally-disposed elements 34 and 36 are provided with positioning orifices 40, as hereinafter more fully described. On the side opposite the outer portion of the plate 32 on which the support members 34 and 36 are mounted, there are mounted upper and lower vertically-disposed positioning elements 42 and 44 respectively, formed of bar members welded to such side of the plate 32 of the side wall member 20.

The outer wall member 22 is comprised of a trapezoidally-shaped plate 46 to which are mounted upper and lower laterally-disposed support elements 48 and 50 and vertically-disposed elements 52.

As hereinabove discussed, the wall members 18, 20 and 22 are separately fabricated and shipped to the plant site for assembly of the rotor in the field erection of the rotary extractor. Accordingly, after positioning the radially-extending upper and lower I-beam members 12 and 14, as discussed in U.S. Pat. No. 4,125,379, hereby incorporated by reference, side wall members 20 are positioned on respective radially-shaped I-beam members 12 and 14 whereby the leg portion 38 of the angle element 34 is caused to rest upon the upper portion of the I-beam 12 member with the bar member 36 caused to become in contact with the lower portion of the I-beam member 14, as more clearly illustrated in FIG. 3.

The inner wall member 18 is positioned between the side wall members 20 or the side wall members are caused to be moved inwardly to a point whereby the side edges of the plate member 24 is caused to contact the upper and lower positioning elements 42 and 44 of the plates 32 forming the side wall members 20 whereupon the inner wall member 18 is mounted, such as by welding to the side walls member 20, the positioning orifices 40 of the side wall members 20 being caused to coincide with positioning orifices 54 formed in the cell support I-beam 12 and positioning orifices 56 in the cell hinge support I-beam 14 whereupon suitable nut and bolt assemblies (not shown) are caused to be positioned and tightened therein for fixedly positioning the side walls 20 to such I-beam members. Thereupon the outer wall member 22 is positioned between the mounted side wall members 20 at a point where the side edges of the plate 46 are caused to contact the outer, upper and lower positioning elements 42 and 44 whereupon the end wall member 22 is mounted such as by welding to the side walls 22. Such procedure is continued until all of the inner, side and outer wall members are fixedly positioned to one another and to the radially-disposed I-beam members 12 and 14.

As hereinabove discussed, in order to insure fluid flow into adjoining cell members, a gable member, generally indicated as 60, is positioned over paired side walls 22 and mounted to each upper radially-disposed cell support I-beams 12. The gable member 60 is comprised of elongated plate members 62 and 64 mounted to one another in inverted V-shaped form and mounted to end plates 66 and 68 to which are mounted positioning and support angle bars 70 including positioning orifices 72 to be aligned with respect to positioning orifices 74 formed in the I-beams 12.

After positioning of the wall members 22, the gable assembly 60 is suitably located with respect to the positioning orifices 72 of the gable assembly 60 and the orifices 74 of the I-beams 12 whereupon the gable assembly 60 is affixed to the I-beams 12, such as by nut and bolt assemblies, (not shown).

While the invention has been described in connection with a preferred embodiment thereof, it will be understood that many modifications will be apparent to those of ordinary skill in the art; and that this application is intended to cover any adaptations or variations thereof.

What is claimed:

1. In a rotary solvent extractor including a vessel having a vertically-disposed rotor from which there is radially-disposed a plurality of cells arranged in a circumferential manner on a generally horizontal plane wherein each of said cells is disposed between radially-extending upper and lower support beams members mounted to said vertically-disposed rotor and wherein each cell is open at the top and provided with a hinged screen bottom door member, an improved cell assembly, which comprises:

side wall members having a cell surface and a side wall mounting surface, said side wall mounting surface having upper and lower prefabricated horizontally-disposed mounting elements, said mounting elements being positioned and affixed to said upper and lower support beam members, respectively, said cell surface of said side wall members being provided with prefabricated upper and lower inner and outer positioning bar elements;

an inner wall member having a cell surface and disposed between said side wall members with respect to said upper and lower inner positioning bar elements thereof;

an outer side wall member having a cell surface and disposed between said side wall members with respect to said upper and lower outer positioning bar elements; and a gable cap means disposed over paired side wall members of adjacent cells to direct liquid flow into respective cells thereof.

2. In a rotary solvent extractor as defined in claim 1 wherein said upper and lower inner and outer positioning elements are vertically-disposed bar members.

3. In a rotary solvent extractor as defined in claim 1 wherein said upper horizontally-disposed mounting elements of said side wall is a generally L-shaped longitudinally extending member having a horizontally-extending leg portion extending outwardly a distance greater than said lower horizontally-disposed mounting element.

4. In a rotary solvent extractor as defined in claim 1 wherein said upper and lower support beam members and said upper and lower horizontally-disposed mounting elements include preformed orifices for appropriately positioning said side wall members with respect to said upper and lower support beams, respectively.

5. In a rotary solvent extractor as defined in claim 4 wherein said gable cap means and said upper support beam members include preformed orifices for positioning said gable member with respect to said upper support beam member.

* * * * *